US010064500B2

(12) United States Patent
Furui et al.

(10) Patent No.: US 10,064,500 B2
(45) Date of Patent: Sep. 4, 2018

(54) ARTICLE MOVING DEVICE AND DISPLAY RACK

(71) Applicant: SEKISUI PLASTICS CO., LTD., Osaka (JP)

(72) Inventors: Takanori Furui, Tokyo (JP); Nobuhiko Kushima, Ibaraki (JP); Yuichiro Soda, Tokyo (JP)

(73) Assignee: SEKISUI PLASTICS, CO., LTD., Osaka (JP)

( * ) Notice: Subject to any disclaimer, the term of this patent is extended or adjusted under 35 U.S.C. 154(b) by 0 days.

(21) Appl. No.: 15/515,331

(22) PCT Filed: Sep. 30, 2015

(86) PCT No.: PCT/JP2015/077815
§ 371 (c)(1),
(2) Date: Jul. 7, 2017

(87) PCT Pub. No.: WO2016/052650
PCT Pub. Date: Apr. 7, 2016

(65) Prior Publication Data
US 2017/0367500 A1    Dec. 28, 2017

(30) Foreign Application Priority Data

Sep. 30, 2014  (JP) ................................. 2014-201095
Sep. 30, 2014  (JP) ................................. 2014-201096

(51) Int. Cl.
*A47F 1/04* (2006.01)
*A47F 5/00* (2006.01)
(Continued)

(52) U.S. Cl.
CPC ................ *A47F 1/12* (2013.01); *A47F 5/005* (2013.01); *B65G 1/023* (2013.01); *B65G 1/08* (2013.01);
(Continued)

(58) Field of Classification Search
CPC ... A47F 1/12; A47F 5/005; A47F 1/04; B65G 1/023; B65G 1/08; B65G 13/11; B65G 2201/0244; B65G 2201/0252; B65G 1/026
(Continued)

(56) References Cited

U.S. PATENT DOCUMENTS 4,765,493 A * 8/1988 Kinney .................. B65G 1/023
193/35 R
5,115,920 A * 5/1992 Tipton .................. B65G 1/023
211/151
(Continued)

FOREIGN PATENT DOCUMENTS

DE    102011051857 B3 * 10/2012 ............... A47F 1/12
EP        2944228 A1 * 11/2015 ............... A47F 1/12
(Continued)

OTHER PUBLICATIONS

Mitsubishi Engineering-Plastics Corp; lupital F30-03 Acetal (POM) Copolymer, i.e., "Lupital"; Sep. 3, 2012. (Year: 2012).*
(Continued)

*Primary Examiner* — Jennifer E. Novosad
(74) *Attorney, Agent, or Firm* — Greenberg & Bernstein, P.L.C.

(57) ABSTRACT

An article moving device includes a plurality of roller members, a base member which has a bottom plate section and a peripheral wall section and accommodates the plurality of roller members, and a plate-shaped cover member which is detachably attached to the peripheral wall section so as to cover an opening section surrounded by the peripheral wall section, wherein the base member is formed of a material having a flexural modulus of 2500 MPa to 4000 MPa, a first parameter of 7.00 to 18.00, as calculated by the formula: flexural modulus (MPa)×yield stress in tension (MPa)×thickness (mm)/density (g/cm$^3$)/100000, and a sec-
(Continued)

ond parameter of 2.00 to 10.00, as calculated by the formula: first parameter×nominal tensile strain at break (%)/100.

16 Claims, 6 Drawing Sheets

(51) Int. Cl.
    *A47F 7/00*     (2006.01)
    *A47F 1/12*     (2006.01)
    *B65G 1/02*     (2006.01)
    *B65G 1/08*     (2006.01)
    *B65G 13/11*     (2006.01)

(52) U.S. Cl.
    CPC ...... *B65G 13/11* (2013.01); *B65G 2201/0244* (2013.01); *B65G 2201/0252* (2013.01)

(58) Field of Classification Search
    USPC .............. 211/59.2, 162, 151; 414/276, 286
    See application file for complete search history.

(56) References Cited

U.S. PATENT DOCUMENTS

| | | | | |
|---|---|---|---|---|
| 5,259,518 A * | 11/1993 | Sorenson | ............... | B65G 1/023 211/151 |
| 5,295,591 A * | 3/1994 | Slater | ............... | A47B 47/027 211/151 |
| 5,779,064 A * | 7/1998 | Dolling | ............... | A47B 47/021 211/151 |
| 5,788,090 A * | 8/1998 | Kajiwara | ............... | A47F 7/28 211/151 |
| 6,089,385 A * | 7/2000 | Nozawa | ............... | A47F 7/28 193/35 R |
| 6,095,347 A * | 8/2000 | Mauro-Vetter | ............... | B65G 1/08 211/151 |
| 6,105,798 A * | 8/2000 | Gruber | ............... | B65G 1/023 211/151 |
| 6,132,158 A * | 10/2000 | Pfeiffer | ............... | B65G 1/023 193/35 R |
| 6,431,808 B1 * | 8/2002 | Lowrey | ............... | B65G 1/023 193/35 R |
| 6,490,983 B1 * | 12/2002 | Nicholson | ............... | A47F 1/12 108/106 |
| 6,497,326 B1 * | 12/2002 | Osawa | ............... | A47F 7/28 211/59.2 |
| 6,571,542 B1 * | 6/2003 | Fillman | ............... | A01D 34/58 56/10.2 A |
| RE38,517 E * | 5/2004 | Pfeiffer | ............... | B65G 1/023 193/35 R |
| 6,830,146 B1 * | 12/2004 | Scully | ............... | B65G 21/2072 198/836.1 |
| 6,948,900 B1 * | 9/2005 | Neuman | ............... | B62B 3/002 193/35 R |
| 7,007,790 B2 * | 3/2006 | Brannon | ............... | B65G 69/22 198/346 |
| 7,114,606 B2 * | 10/2006 | Shaw | ............... | B65G 1/023 193/35 R |
| 7,628,282 B2 * | 12/2009 | Hardy | ............... | A47F 1/126 211/151 |
| 7,815,060 B2 * | 10/2010 | Iellimo | ............... | B65G 1/023 108/61 |
| D655,106 S * | 3/2012 | Czalkiewicz | ............... | D6/675.5 |
| 8,276,772 B2 * | 10/2012 | Kim | ............... | A47F 1/12 211/151 |
| 8,360,271 B2 * | 1/2013 | Omura | ............... | B65G 1/08 221/4 |
| 8,376,154 B2 * | 2/2013 | Sun | ............... | A47F 1/125 193/35 J |
| 8,596,443 B2 * | 12/2013 | Brugmann | ............... | A47F 5/0093 193/35 R |
| 8,662,325 B2 * | 3/2014 | Davis | ............... | A47B 57/585 211/151 |
| 8,844,431 B2 * | 9/2014 | Davis | ............... | A47J 37/0676 99/441 |
| 8,893,902 B2 * | 11/2014 | Dotson | ............... | B65G 1/023 193/35 TE |
| 9,038,804 B1 * | 5/2015 | Nickell | ............... | B65G 13/11 193/35 R |
| 9,375,098 B2 * | 6/2016 | Sun | ............... | A47F 1/126 |
| 9,420,900 B1 * | 8/2016 | Simpson | ............... | B65G 1/08 |
| 9,549,622 B2 * | 1/2017 | Leahy | ............... | A47F 5/005 |
| 2001/0017284 A1 * | 8/2001 | Watanabe | ............... | A47F 1/12 211/59.2 |
| 2010/0206829 A1 * | 8/2010 | Clements | ............... | A47F 1/12 211/162 |
| 2011/0204012 A1 | 8/2011 | Eguchi et al. | | |
| 2012/0217212 A1 * | 8/2012 | Czalkiewicz | ............... | A47F 1/12 211/59.2 |
| 2014/0299560 A1 * | 10/2014 | Kim | ............... | A47F 1/126 211/59.2 |
| 2015/0114918 A1 * | 4/2015 | Nickell | ............... | B65G 13/11 211/59.2 |
| 2017/0367500 A1 * | 12/2017 | Furui | ............... | A47F 1/12 |

FOREIGN PATENT DOCUMENTS

| | | | | |
|---|---|---|---|---|
| EP | 3117743 A1 * | 1/2017 | ............... | A47F 1/12 |
| JP | Y-50-32948 | 9/1975 | | |
| JP | A-07-000260 | 1/1995 | | |
| JP | A-8-299121 | 11/1996 | | |
| JP | B-3208733 | 9/2001 | | |
| JP | A-2001-340180 | 12/2001 | | |
| JP | B-3635623 | 4/2005 | | |
| JP | A-2010-537705 | 12/2010 | | |
| JP | A-2011-115479 | 6/2011 | | |
| TW | M421057 | 1/2012 | | |
| TW | M449533 | 4/2013 | | |
| WO | WO99/30597 A1 | 6/1999 | | |
| WO | WO-9930597 A1 * | 6/1999 | ............... | A47F 1/12 |
| WO | WO2009/075409 A1 | 6/2009 | | |
| WO | WO-2010108829 A1 * | 9/2010 | ............... | A47F 1/12 |

OTHER PUBLICATIONS

Search Report issued in related Japanese Patent Application No. PCT/JP2015/077815, dated Nov. 17, 2015 (and English-language translation).

Taiwanese Office Action in related Taiwanese Application No. 104132387, dated Aug. 3, 2016 (and English-language translation).

* cited by examiner

FIG. 8

ARTICLE MOVING DEVICE AND DISPLAY RACK

CROSS REFERENCE TO RELATED APPLICATIONS

This application is a continuation application based on a PCT Patent Application No. PCT/JP2015/077815, filed Sep. 30, 2015, whose priority is claimed on Japanese Application No. 2014-201095, filed on Sep. 30, 2014, and No. 2014-201096, filed on Sep. 30, 2014, the entire content of which are hereby incorporated by reference.

FIELD OF THE INVENTION

The present invention relates to an article moving device and a display rack.

DESCRIPTION OF THE RELATED ART

Conventionally, in stores such as convenience stores, display racks are used when displaying and selling products. By using display racks, a large number of articles can be displayed in a limited space for ease of viewing. As a result, management of the articles is facilitated, and the articles can be appealed to customers more effectively.

Examples of articles to be displayed on display racks include those containing liquids such as soft drinks in cans, polyethylene terephthalate (PET) bottles, or the like. The articles are placed in a state of being arranged from a front side of the display rack, i.e. from a side at which a customer stands to pick up the articles from the display rack, toward the back side.

When an article placed at the front side of the display rack is removed from the display rack by a customer or the like, a blank area in which an article is not placed is formed on the display rack. To infill the blank area with an article, an article placed further toward the back than the blank area may be moved toward the front side.

As a means for moving an article placed on a display rack from a back side toward a front side, an article moving device having a plurality of roller members arranged in a direction connecting the front side and the back side of the display rack has been proposed.

For example, Japanese Patent Publication No. 3635623 discloses an article moving tool in which a shaft of a roller member is press-fitted into a shaft hole formed in a base member so that a plurality of roller members are installed on a substantially rectangular drawer body. For example, Japanese Patent Publication No. 3208733 discloses an article moving tool in which roller members configured to support products in a direction perpendicular to a moving direction of the products are rotatably installed in parallel to each other in a base member and in which shafts of the roller members are supported at a flat surface with the same height and on which a cover member having a through-hole capable of allowing exposure and protrusion of upper roller surfaces of the roller members is attached.

SUMMARY

An article moving device including a plurality of roller members, a base member which has a bottom plate section and a peripheral wall section rising from a peripheral edge section of the bottom plate section and which rotatably accommodate the plurality of roller members, and a plate-shaped cover member which is detachably attached to the peripheral wall section so as to cover an opening section surrounded by the peripheral wall section such that a part of a roller surface of each roller member protrudes through the plate-shaped cover member, wherein the base member is formed of a material having a flexural modulus of 2500 MPa to 4000 MPa, a first parameter of 7.00 to 18.00, as calculated by the formula: flexural modulus (MPa)×yield stress in tension (MPa)×thickness (mm)/density (g/cm$^3$)/100000, and a second parameter of 2.00 to 10.00, as calculated by the formula: first parameter×nominal tensile strain at break (%)/100.

Also, the flexural modulus (MPa) indicates a value measured in accordance with ISO 178. The yield stress in tension (MPa) and the nominal tensile strain at break (%) indicate values measured in accordance with ISO 527-1, 2.

The density (g/cm$^3$) indicates a value measured in accordance with ISO 1183.

Further, the thickness (mm) indicates a thickness of the thickest section of the base member.

As a second aspect of the present invention, in the article moving device according to the first aspect, the cover member is formed of the same material as the base member.

As a third aspect of the present invention, in the article moving device according to the first aspect or the second aspect, the peripheral wall section has a wall-side engaging protrusion extending on its side facing or on its side opposite to the opening section. The cover member has a cover-side engaging protrusion which is engaged with the wall-side engaging protrusion when the cover member is disposed over the opening section such that movement of the cover member in a direction away from the bottom plate section of the cover member is suppressed. The wall-side engaging protrusion has a wall-side hook section which protrudes toward the cover-side engaging protrusion when the cover member is disposed over the opening section. The cover-side engaging protrusion has a cover-side hook section which protrudes toward the wall-side engaging protrusion and is engaged with the wall-side hook section such that movement of an end surface of the cover member facing the peripheral wall section in a direction away from the peripheral wall section is suppressed.

As a fourth aspect of the present invention, in the article moving device according to the third aspect, a protruding length of the cover-side hook section is 0.3 mm to 1.3 mm.

As a fifth aspect of the present invention, in the article moving device according to any one of the first aspect, second aspect, and fourth aspect, at least part of the peripheral wall section that extends in a direction orthogonal to an axial direction of the roller members accommodated in the base member has a function of a beam member.

A display rack according to a sixth aspect of the present invention includes at least one article moving tool according to any one of the first aspect to the fifth aspect.

An article moving tool according to a seventh aspect of the present invention includes a plurality of roller members, a base member which has a bottom plate section and a peripheral wall section rising from a peripheral section of the bottom plate section and which rotatably accommodates the plurality of roller members, and a plate-shaped cover member which is detachably attached to the peripheral wall section so as to cover an opening section surrounded by the peripheral wall section such that a part of a roller surface of each roller member protrudes through the plate-shaped cover member. The peripheral wall section has a wall-side engaging protrusion protruding on its side facing or on its side opposite to the opening section is provided. The cover member has a cover-side engaging protrusion which is engaged with the wall-side engaging protrusion when the cover member is disposed over the opening section such that movement of the cover member in a direction away from the bottom plate section of the cover member is suppressed. The wall-side engaging protrusion has an wall-side hook section which protrudes toward the cover-side engaging protrusion when the cover member is disposed over the opening section. The cover-side engaging protrusion has a cover-side hook section which protrudes toward the wall-side engaging protrusion and is engaged with the wall-side hook section such that movement of an end surface of the cover member facing the peripheral wall section in a direction away from the peripheral wall section is suppressed.

As a eighth aspect of the present invention, in the article moving device according to the seventh aspect, a protruding length of the cover-side hook section is 0.3 mm to 1.3 mm.

A display rack according to a ninth aspect of the present invention includes at least one article moving device according to the seventh aspect or the eighth aspect.

An article moving device according to a tenth aspect of the present invention includes a plurality of roller members, a base member which has a bottom plate section and a peripheral wall section rising from a peripheral section of the bottom plate section and which rotatably accommodates the plurality of roller members, and a plate-shaped cover member which is detachably attached to the peripheral wall section so as to cover an opening section surrounded by the peripheral wall section such that a part of a roller surface of each roller member protrudes through the plate-shaped cover member. At least, a part of the peripheral wall section that extends in a direction orthogonal to an axial direction of the roller members accommodated in the base member has a function of a beam member.

A display rack according to a eleventh aspect of the present invention includes at least one article moving device according to the tenth aspect.

The present invention provides an article moving device which exhibits excellent strength and flexibility even with a small thickness, and a display rack having the article moving device. Such an article moving device of the present invention is unlikely to suffer considerable bending of or damage to a base member even when being dropped, carried, or the like, and can present scattering of roller members.

Further, the present invention also provides an article moving device capable of preventing scattering of a roller member, and a display rack having the article moving device.

DETAILED DESCRIPTION OF THE PREFERRED EMBODIMENTS

Hereinafter, embodiments of the article moving device and the display rack according to the present invention will be described with reference to the drawings. The present embodiments are for the purpose of specifically describing the gist of the invention and by no means limit the present invention. Further, the drawings referred to in the following description are schematic, and ratios between lengths, widths, and thicknesses do not necessarily reflect those in actual products and can be appropriately changed.

<Article Moving Device>

Figure 1:
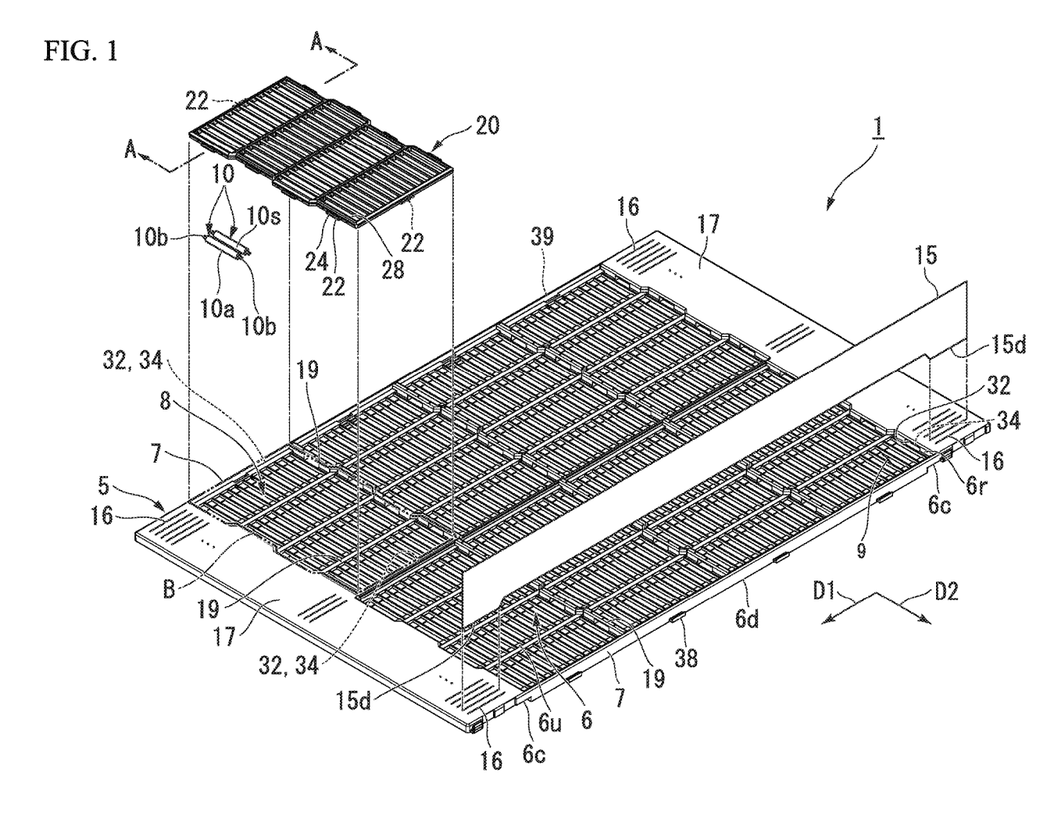
FIG. 1 is a schematic exploded view illustrating elements of an article moving device according to an embodiment of the present invention.

FIG. 1 is a schematic exploded view illustrating elements of an article moving device 1.

Figure 6:
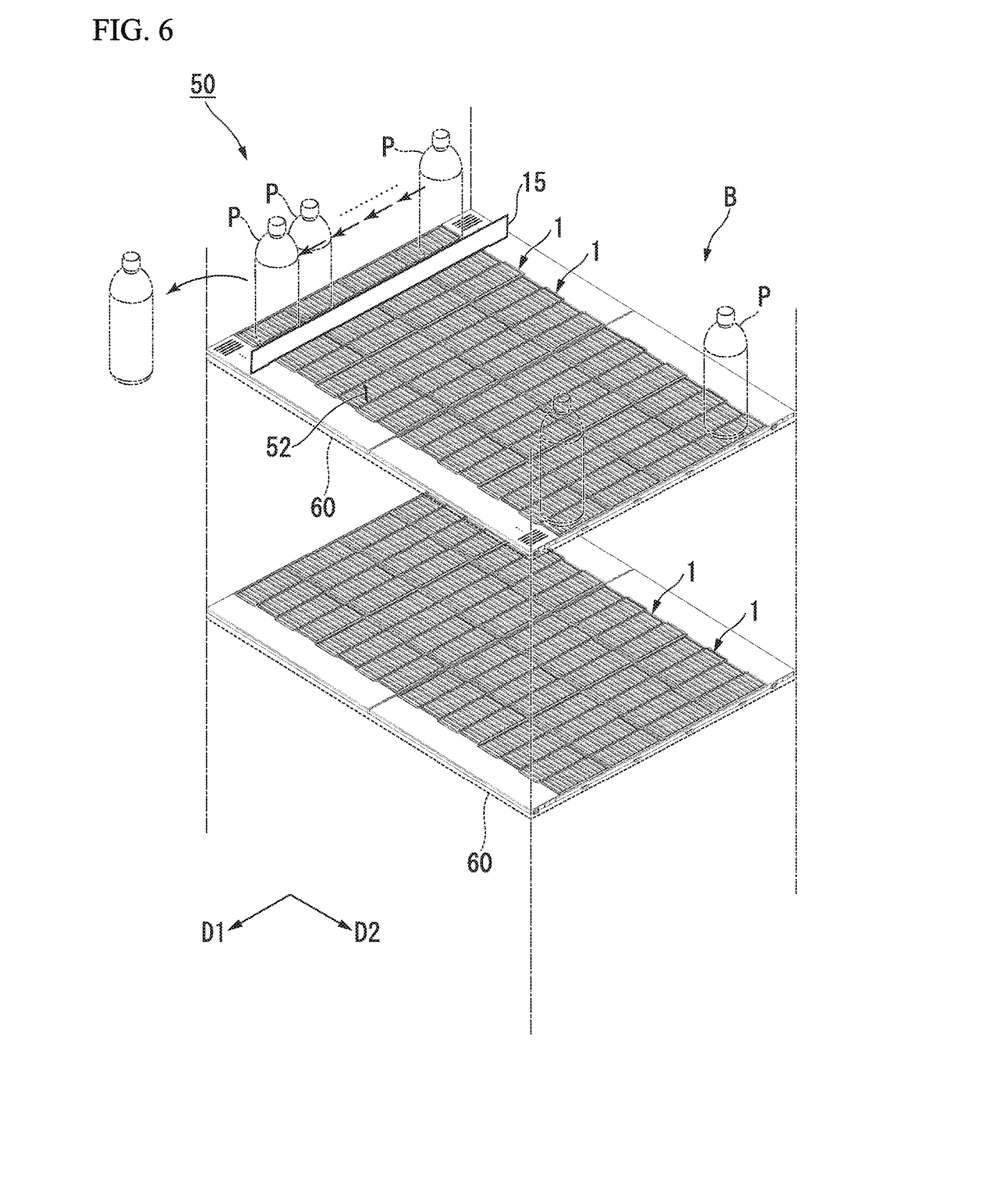
FIG. 6 is a schematic view illustrating a display rack according to an embodiment of the present invention.

The article moving device 1 is installed in a display rack on which articles P are placed (see FIG. 6). The article moving device 1 is configured to move the articles P placed on the article moving device 1 from a back side toward a front side of the display rack. The articles P may be, for example, articles containing a liquid such as a soft drink in a can, a polyethylene terephthalate (PET) bottle, or the like, but are not particularly limited thereto.

In the following description, the front side of the display rack may also be referred to as "a front," and the back side of the display rack may also be referred to as "a back." A side of the article moving device 1 on which an article is placed may also be referred to as "a top," and a side facing the side on which an article is placed may also be referred to as "a bottom."

As illustrated in FIG. 1, the article moving device 1 is formed in a plate shape and includes a plurality of roller members 10, a base member 5 configured to rotatably accommodate each of the plurality of roller members 10, and a cover member 20 mounted on the base member 5 such that parts of roller surfaces 10s of the plurality of roller members 10 protrude through the cover member 20.

By the articles placed on the roller surface 10s of the roller members 10, the article moving device 1 moves the articles P in one direction (a direction of an arrow D1 illustrated in FIG. 1 or a reverse direction to the direction of the arrow D1) (see FIG. 6). In the present embodiment, the plurality of roller members 10 are arranged in one direction orthogonal to an axis of the roller members 10, and the plurality of roller members 10 are arranged in the axial direction of the roller members 10.

The roller member 10 includes a roller main body part 10a configured to come into contact with an article, and roller shaft parts 10b and 10 b protruding from both axial ends of the roller main body part 10a. The roller main body part 10a has the roller surface 10s of the roller member 10. The diameter of the roller main body part 10a is not particularly limited and is preferably set appropriately in consideration of a weight, a bottom area, or the like of an article. A lower end of the roller shaft part 10b can abut an upper surface 6u of a bottom plate section 6 from above when accommodated in the base member 5. The diameter of the roller shaft part 10b is not particularly limited and is preferably set appropriately in consideration of the diameter of the roller main body part 10a or a depth of a roller member accommodating section 8 which will be described below.

Examples of a material of the roller member 10 include polyacetal resin (POM). However, the material is not limited to POM as long as the roller member 10 can be smoothly rotated to smoothly move an article. An additive or the like for giving lubricity such as a silicone may be added to improve frictional properties.

Further, from the viewpoint of smoothly rotating the roller main body part 10a of the roller member 10, the roller shaft part 10b is preferably formed of a material which has a static friction coefficient of about 0.1 to 0.5 with respect to the material of the base member 5 and the cover member 20. The static friction coefficient indicates a value measured by ISO 8295.

The base member 5 is formed in a plate shape and has the bottom plate section 6, a sidewall section 7 rising from a peripheral section 6r of the bottom plate section 6 and extending in a direction orthogonal to the axial direction of the roller members 10 accommodated in the base member 5 (i.e., the direction of the arrow D1), and a partition member support section 17 rising from the peripheral section 6r of the bottom plate section 6 and extending in a direction parallel to the axial direction of the roller members 10 accommodated in the base member 5 (i.e., a direction of an arrow D2).

Figure 2:
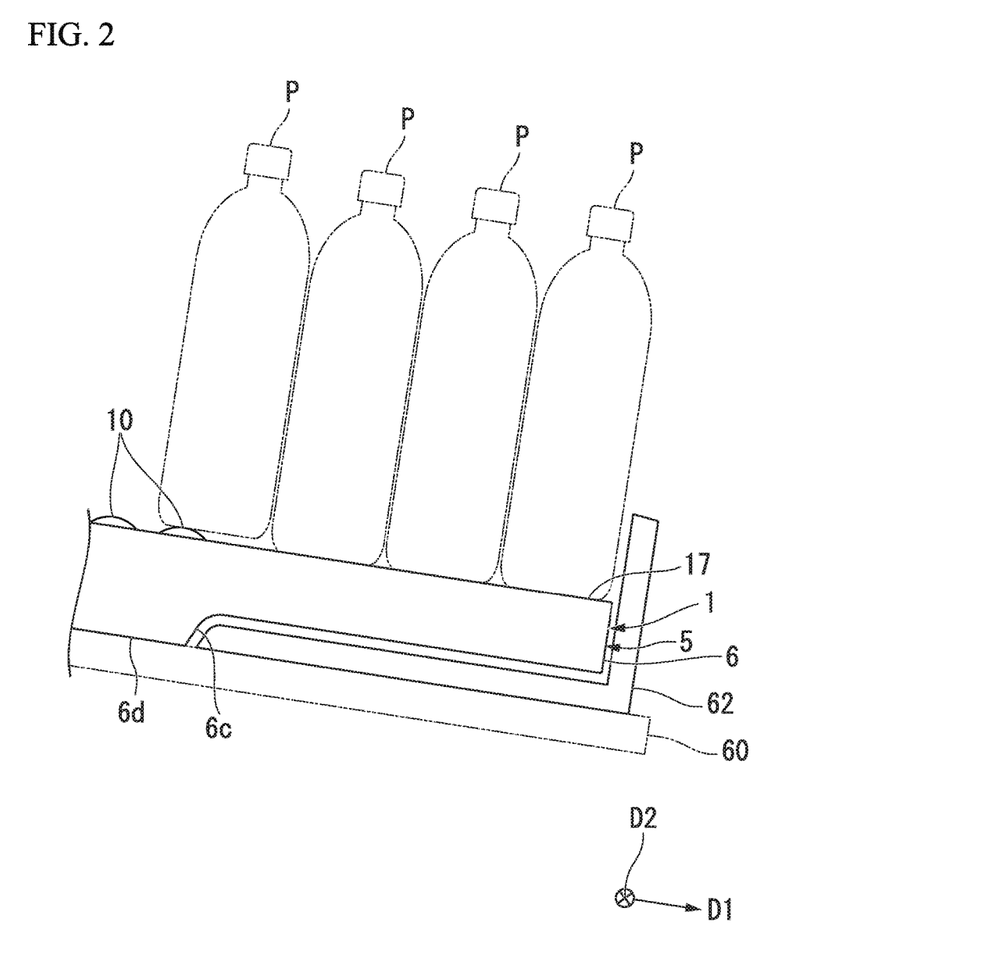
FIG. 2 is a side view of an end of a base member of the article moving device according to an embodiment of the present invention.

FIG. 2 is a side view illustrating an end of the bottom plate section 6 in an enlarged manner. A cutout section 6c is formed on a part disposed at a front side of a display rack 50 in a bottom surface 6d of the bottom plate section 6. i.e., a bottom surface of the partition member support section 17. As illustrated in FIG. 2, because the cutout section 6c is formed, the article moving device 1 is placed on a rack board 60 of the display rack 50, and a bottom surface of a stopper 62 is disposed in the cutout section 6c when the stopper 62 is inserted between the partition member support section 17 of the base member 5 and the rack board 60. Therefore, unlike the conventional case, the roller members 10 in the vicinity of the partition member support section 17 (i.e., the article moving device 1 disposed on the stopper 62) keep a desired inclination angle before the stopper 62 is installed, and suppresses a decrease in smoothness of advance of the article P in the article moving device 1. The depth of the cutout section 6c is not particularly limited.

As illustrated in FIG. 1, roller member accommodating sections 8 equal in number to the roller members 10 accommodated in the base member 5 are formed in the bottom plate section 6. The roller member accommodating sections 8 can accommodate a part of the roller main body parts 10a. In the present embodiment, the plan view shape of the roller member accommodating sections 8 is a rectangular shape similar to the plan view shape of the roller main body part 10a below the roller shaft part 10b. A cross-sectional shape of the roller member accommodating sections 8 in the longitudinal direction is a rectangular shape or a substantially semicircular shape similar to the longitudinal cross-sectional shape of the roller main body part 10a below the roller shaft part 10b. Because the roller member accommodating sections 8 are formed in such a shape, when the roller members 10 are placed in the base member 5, sides of the roller main body parts 10a below the roller shaft part 10b can be accommodated in the roller member accommodating sections 8. Also, the roller shaft part 10b can abut the upper surface 6u of the bottom plate section 6 from above. That is, the roller members 10 are rotatably held by the cover member 20, which will be described below by the roller shaft parts 10b at both ends of the roller members 10 being supported by the upper surface 6u of the bottom plate section 6.

In plan view, the roller member accommodating sections 8 are formed at positions corresponding to positions at which the roller members 10 are placed in the article moving device 1. In the present embodiment, the plurality of roller member accommodating sections 8 are formed along one direction orthogonal to the longitudinal direction of the roller member accommodating sections 8 in plan view (the direction of the arrow D1 illustrated in FIGS. 1 and 2). Also, the plurality of roller member accommodating sections 8 are formed in the longitudinal direction in plan view. In the present embodiment, the roller member accommodating sections 8 arranged in the longitudinal direction of the roller member accommodating sections 8 (the direction of the arrow D2 illustrated in FIGS. 1 and 2) are formed at different positions in a transverse direction of the roller member accommodating sections 8. The roller member accommodating sections 8 arranged in the longitudinal direction of the roller member accommodating sections 8 may be formed at the same position in the transverse direction of the roller member accommodating sections 8.

In consideration of ease of assembling the article moving device 1, in the article moving device 1, an opening section 9 surrounded by the sidewall section 7 and the partition member support section 17 is partitioned into a plurality of partitioned areas B, and the cover member 20 is assigned to each of the partitioned areas B.

In the present embodiment, a total of eight cover members 20 can be arranged with respect to one base member 5, four in the direction of the arrow D1 and two in the direction of the arrow D2. In FIG. 1, one cover member 20 of the eight cover members 20 assigned to one article moving device 1 (the opening section 9) is illustrated, and other cover members 20 are omitted. One cover member 20 may be disposed with respect to one base member 5 as long as handling a cover member 20 having a large area is easy and there is no problem in ease of assembling the article moving device 1. Also, the number of cover members 20 disposed may be less than eight or nine or more. That is, the number of cover members 20 disposed with respect to one base member 5 is not particularly limited and may be appropriately set in consideration of manufacturing conditions and a size, a shape, and the like of the display rack 50.

A partition wall 19 configured to partition an area in which the roller member accommodating sections 8 are arranged in the directions of the arrows D1 and D2 (the longitudinal and transverse directions) into the plurality of partitioned areas B is provided at the upper surface 6u of the bottom plate section 6.

The sidewall section 7 preferably has a function of a beam member. Here, "having a function of a beam member" indicates being able to bear a bending stress generated due to bending or the like caused by the weight of the base member 5 and, for example, means that, when one end of the sidewall section 7 is placed on a horizontal table or the like, dropping (bending) of the other end due to its own weight is minimized. In the present embodiment, the sidewall section 7 has a function of a beam member by being formed to cross the partition member support sections 17 at both ends along the direction of the arrow D1. A width dimension of the sidewall section 7 is appropriately set in consideration of the material and the like of the base member 5. The width dimension of the sidewall section 7 is preferably larger than the width the partition wall 19 and/or the partition member support section 17 which will be described later. Also, materials that can exhibit a function of a beam member may be individually used for the sidewall section 7.

Further, a thickness (height) of the sidewall section 7 in the longitudinal direction does not have to be continuously constant to "have a function of a beam member." The height of the sidewall section 7 may be located at a position at which an upper surface of the sidewall section 7 is higher than the upper surface 6u of the bottom plate section 6 and lower than the upper surface of the roller members 10.

A connecting section 38 protruding from an outer wall surface of the sidewall section 7 in a direction parallel to the axial direction of the roller members 10 (i.e., the direction of the arrow D2) is provided at the sidewall section 7 at one side (in FIG. 1, the sidewall section 7 at a front side of the page). At a distal end of the connecting section 38, a hook section protruding upward from the distal end is provided. A connected section 39 cut out inward from the outer wall surface of sidewall section 7 is formed at the sidewall section 7 at the other side (in FIG. 1, the sidewall section 7 at the back side in the page). The receiving section 39 is formed corresponding to the shape of the connecting section 38 so that the connecting section 38 can be fitted thereinto.

Figure 5:
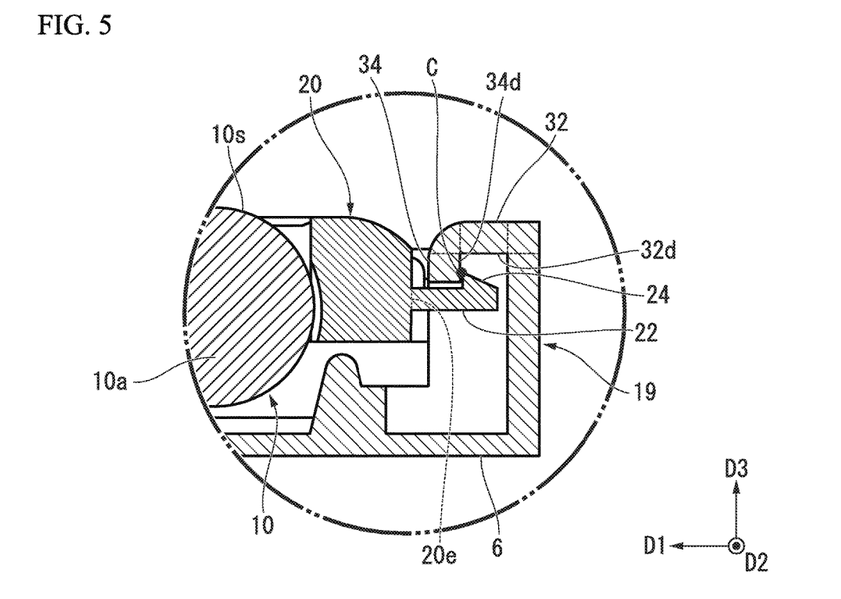
FIG. 5 is a view illustrating an article moving device according to an embodiment of the present invention and is an enlarged cross-sectional view of an area X1 illustrated in FIG. 4.

As illustrated in FIGS. 1 and 5, when a plurality of rows of articles P are formed on the article moving device 1, it is preferable that a partition member 15 is disposed between the rows of the articles P. In consideration of providing a structure for supporting the partition member 15, the partition member support section 17 is formed with a width dimension larger than that of the sidewall section 7. In the partition member support section 17 of the present embodiment, a plurality of fitting holes 16 having a dimension smaller than the width dimension of the partition member support section 17 are formed at intervals along a moving direction of the article P. The partition member 15 is an elongated plate member formed as, for example, an acrylic resin plate, a plastic plate, an aluminum plate, or the like. Legs 15d that can be fitted into the fitting holes 16 are provided at a bottom end in the longitudinal direction of the partition member 15. That is, the partition member 15 is disposed along the moving direction of the article P by the legs 15d being fitted into desired fitting holes 16. Because the article P on the article moving device 1 moves along the partition member 15 due to the partition member 15 being mounted on the base member 5, the moving direction of the article P is unlikely to deviate from a desired direction.

The shape and form of the partition member 15 are not particularly limited as long as the partition member 15 is attachable to the article moving device 1. The shape and form of the fitting hole 16 may also be appropriately changed according to the shape and form of the partition member 15.

For example, the connecting section 38 or the receiving section 39 may also be formed at the partition member support section 17 as needed, for example, when connecting a plurality of base members 5 also along the direction of the arrow D1 in the display rack 50.

An wall-side engaging protrusion 32 is provided in a wall surface that surrounds each of the partitioned areas B in the partition wall 19 and the partition member support section 17. The wall-side engaging protrusion 32 protrudes from the wall surface facing or the wall surface opposite to each of the partitioned areas B. In FIGS. 1 to 8, the wall-side engaging protrusion 32 protruding from the wall surface facing each of the partition areas B is illustrated. An wall-side hook section 34 is formed at a distal end of the wall-side engaging protrusion 32. The shape of the wall-side hook section 34 is not particularly limited. The cross-sectional shape of the wall-side hook section 34 can be appropriately designed, for example, as rectangular, triangular, particularly right triangular or the like.

The base member 5 is formed of a material which has a flexural modulus of 2500 MPa to 4000 MPa, preferably 2500 MPa to 3000 MPa. and for which a first parameter S1 is 7.00 to 18.00, preferably 7.00 to 15.00, and a second parameter S2 is 2.00 to 10.00. The first and second parameters S1 and S2 are values expressed by the following formulas (1) and (2), respectively.

[Math. 1]

$$S1 = \text{flexural modulus (MPa)} \times \text{yield stress in tension (MPa)} \times \text{thickness (mm)} \times \text{density (g/cm}^3\text{)}/100000 \quad (1)$$

[Math. 2]

$$S2 = S1 \times \text{nominal tensile strain at break (\%)}/100 \quad (2)$$

As described above, the flexural modulus (MPa) indicates a value measured in accordance with ISO 178. The yield stress in tension (MPa) and the nominal tensile strain at break (%) indicate values measured in accordance with ISO 527-1, 2. The density (g/cm$^3$) indicates a value measured in accordance with ISO 1183. Further, the thickness (mm) indicates a thickness of the thickest section of the base member 5.

Examples of a material balanced in physical properties as described above include resins such as POM, polyphenylene sulfide (PPS), and high impact polystyrene (HIPS), but the material is not limited to these resins. For reducing the thickness of the article moving device 1 and for enabling the roller members 10 to rotate smoothly, POM is preferable as the material of the base member 5. From the viewpoint of easy handling and processing, as the material of the base member 5, model numbers F30-03 (distributor: Mitsubishi Engineering-Plastics Corporation), and M90-44 (distributor: Polyplastics Co., Ltd.) are suitable among POMs. Table 1 shows configuration examples for describing a structure of the base member 5 of the present embodiment.

TABLE 1

| | Configuration example 1 | Configuration example 2 | Configuration example 3 | Configuration example 4 | Comparative configuration example 1 | Comparative configuration example 2 | Comparative configuration example 3 | Comparative configuration example 4 |
|---|---|---|---|---|---|---|---|---|
| Resin type | POM | POM | PPS | HIPS | HIPS | PC | PMMA | PS |
| Model number | F30-03 | M90-44 | FZ-2100 | H8765 | H8765 | S-3000 | 560F | G200C |
| Distributor | Mitsubishi Engineering-Plastics Corporation | Polyplastics Co., Ltd. | DIC Corporation | PS Japan Corporation | PS Japan Corporation | Mitsubishi Engineering-Plastics Corporation | Asahi Kasei Corporation | Toyo Styrene Co., Ltd. |

TABLE 1-continued

|  | Configuration example 1 | Configuration example 2 | Configuration example 3 | Configuration example 4 | Comparative configuration example 1 | Comparative configuration example 2 | Comparative configuration example 3 | Comparative configuration example 4 |
|---|---|---|---|---|---|---|---|---|
| Flexural modulus [MPa] | 2700 | 2500 | 3800 | 2500 | 2500 | 2300 | 3200 | 3200 |
| Density [g/cm$^3$] | 1.41 | 1.41 | 1.35 | 1.05 | 1.05 | 1.20 | 1.19 | 1.05 |
| Yield stress in Tension [MPa] | 64 | 62 | 80 | 35 | 35 | 62 | 70 | 41 |
| Nominal tensile strain at break [%] | 25 | 35 | 15 | 30 | 30 | 119 | 2.5 | 1 |
| Thickness | 6.9 | 6.9 | 6.9 | 8.7 | 6.9 | 6.9 | 6.9 | 6.9 |
| First parameter S1 | 8.46 | 7.59 | 15.54 | 7.25 | 5.25 | 8.20 | 12.99 | 8.62 |
| Second parameter S2 | 2.11 | 2.65 | 2.33 | 2.18 | 1.73 | 9.76 | 0.32 | 0.09 |

In the configuration examples 1 to 4 and comparative configuration examples 1 to 4 of the base member 5 exemplified in Table 1, first, a strength against bending is imparted to the base member 5 by the flexural modulus of the material of the base member 5 being 2500 MPa to 4000 MPa. For example, this can be understood from configuration examples 1 to 4 and comparative configuration examples 1, 3, and 4 shown in Table 1. To further improve impact absorption properties with elastic deformation of the base member 5 with respect to an external force such as an impact, the flexural modulus is preferably 2500 MPa to 3000 MPa.

Even when the physical properties of the material of the base member 5 are balanced and the thickness of the article moving device 1 is reduced, for both strength and elasticity to be imparted to the base member 5 without excessively increasing the weight of the base member 5, it is important that the yield stress in tension (MPa) is taken into consideration in addition to the thickness (mm) and the density (g/cm$^3$) of the material of the base member 5. This is because tensile stress is locally generated in the base member 5 due to bending when being carried and the like. The first parameter embracing these physical property values can be said to be an index for determining whether the thickness or the density, the bending property, and the tensile property are sufficiently balanced in the base member 5. The material used for the base member 5 has a first parameter S1 ofs 7.00 to 18.00 in addition to having a flexural modulus within the above-mentioned range. For example, these conditions are satisfied in the configuration examples 1 to 4 and the comparative configuration examples 3 and 4 shown in Table 1. To further improve rigidity and impact absorption property, a material with the first parameter S1 of 7.00 to 15.00 is adopted. When the first parameter S1 is less than 7.00, the thickness of the base member 5 and the strength or the elasticity thereof are not balanced; therefore, there is a concern that the base member 5 may be considerably bent or partially damaged due to its own weight or an external force. When the first parameter S1 exceeds 18.00, the rigidity of the material is extremely high and the impact absorption property of the base member 5 is degraded, an impact cannot be dispersed at the time of a large impact such as falling; therefore, there is a concern that the base member 5, the roller member 10, or the cover member 20 may be damaged.

Moreover, for imparting the base member 5 with excellent strength and elasticity, resistance to breakage and a sufficient shape retention and resistance against an external force such as an physical impact, it is important that the nominal tensile strain at break (%) of the base member 5 is taken into consideration in addition to be above. The second parameter embracing the nominal tensile strain at break (%) can be said to be an index in which brittleness of the base member 5 is also taken into consideration. The base member 5 is more brittle when the second parameter is lower. The material used for the base member 5 has the second parameter S2 of 2.00 to 10.00 in addition to having flexural modulus and first parameter in the above-mentioned ranges. For example, this condition is satisfied in the configuration examples 1 to 4 shown in Table 1. When the second parameter S2 is less than 2.00, the base member 5 is brittle, and there is a concern that the base member 5 may be easily damaged due to an external force or bending. When the second parameter S2 exceeds 10.00, the base member 5 is deformed largely before being broken; therefore, a large impact caused by dropping or the like may cause the base member 5 to be deformed even if not broken, such that the base member 5 cannot regain its original shape.

From the viewpoint of enabling the roller main body part 10a of the roller member 10 to rotate smoothly, it is preferable that the base member 5 is formed of a material having a static friction coefficient of about 0.1 to 0.5 with respect to the roller shaft part 10b.

The cover member 20 is a plate-shaped member detachably attached to cover the plurality of partitioned areas B of the base member 5.

Figure 3:
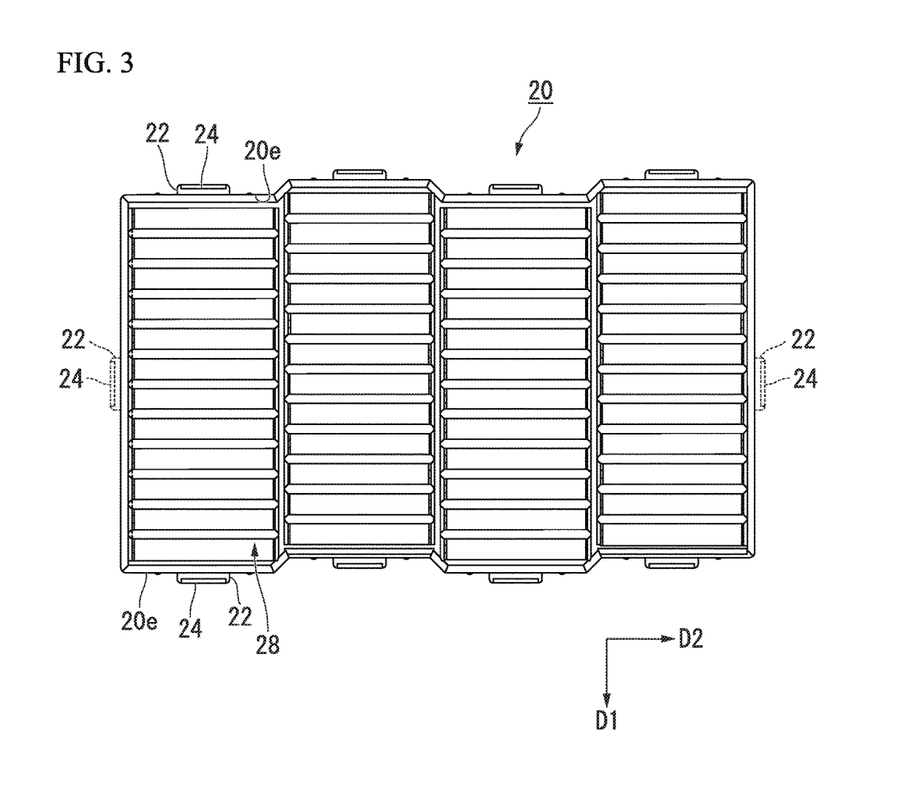
FIG. 3 is a plan view of a cover member of the article moving device according to an embodiment of the present invention.

FIG. 3 is a plan view of the cover member 20. As illustrated in FIGS. 1 and 3, in the cover member 20, roller member penetrating sections 28 equal in number to the number of the roller members 10 accommodated in the partitioned areas B are formed. In the present embodiment, the plan view shape of the roller member penetrating section 28 is a rectangular shape similar to the plan view shape of the roller main body part 10a above the roller shaft part 10b. In plan view, the roller member penetrating section 28 is formed at a position corresponding to a position at which the roller member 10 is placed in the article moving device 1. In this way, the roller member 10 is placed in the roller member accommodating section 8 of the partitioned area B, and, when the cover member 20 is disposed in the partitioned area B, a side of the roller main body part 10a above the roller shaft part 10b may pass through the roller member penetrating section 28 and protrude from the cover member 20 (see FIG. 1). The degree of protrusion of the roller main body part 10a from the cover member 20 is not particularly limited as long as the articles P placed on the article moving device 1 can be smoothly moved from the back side toward the front side of the of the display rack 50. A protruding height of the roller main body part 10a from the cover member 20 is preferably, for example, 1.5% to 15.0% of the diameter of the roller main body part 10a and can be adjusted by controlling the depth of the roller member accommodating section 8 or the thickness of the cover member 20.

An cover-side engaging protrusion 22 protruding from an outer wall section (an end surface 20e) is provided in the cover member 20. An cover-side hook section 24 is formed at a distal end of the cover-side engaging protrusion 22. As illustrated in FIG. 2, in plan view, the cover-side engaging protrusion 22 is disposed at a position overlapping the wall-side engaging protrusion 32 when the cover member 20 is disposed over the partitioned area B. In plan view, the cover-side hook section 24 is disposed at a position overlapping the wall-side hook section 34 when the cover member 20 is disposed over the partitioned area B. The shape of the cover-side hook section 24 is not particularly limited. The cross-sectional shape of the cover-side hook section 24 is appropriately designed, for example, as rectangular, triangular, particularly right triangular or the like. From the viewpoint of facilitating mounting of the cover member 20 on the base member 5 and minimizing separation of the cover member 20 from the base member 5, the cross-sectional shape of the cover-side hook section 24 is preferably a right triangle shape.

An installation position of the cover-side engaging protrusion 22 at the outer wall section of the cover member 20 is not particularly limited. An installation position of the wall-side engaging protrusion 32 at the partition wall 19 and the partition member support section 17 of the base member 5 is also not particularly limited.

In the present embodiment, in plan view, the cover-side engaging protrusions 22 are disposed at both outer wall sections of the cover member 20 extending in a direction parallel to the longitudinal direction of the roller member penetrating sections 28 (the direction of the arrow D2 shown in FIGS. 1 and 2) to face each other with a plate surface of the cover member 20 disposed therebetween. The wall-side engaging protrusions 32 are disposed in one direction orthogonal to the longitudinal direction of the roller member accommodating sections 8 (the direction of the arrow D1 illustrated in FIGS. 1 and 2) to face each other with the bottom plate section 6 disposed therebetween.

Also, as illustrated in FIGS. 1 and 3, from the viewpoint of more reliably preventing the cover member 20 from being separated from the base member 5, in plan view, the cover-side engaging protrusions 22 and the cover-side hook sections 24 illustrated with broken lines may be disposed at both outer wall sections of the cover member 20 extending in the direction orthogonal to the longitudinal direction of the roller member penetrating sections 28 (the direction of the arrow D1 illustrated in FIGS. 1 and 3) to face each other with the plate surface of the cover member 20 disposed therebetween. From the same viewpoint, in plan view, the wall-side engaging protrusions 32 and the wall-side hook sections 34 illustrated with broken lines may be disposed at the sidewall sections 7 in the longitudinal direction of the roller member accommodating sections 8 (the direction of the arrow D2 illustrated in FIGS. 1 and 3) to face each other with the bottom plate section 6 disposed therebetween.

Here, the peripheral wall section in the present invention refers to a part or the whole of the sidewall section 7, a part or the whole of the partition member support section 17, and a part or the whole of the partition wall 19.

Figure 4:
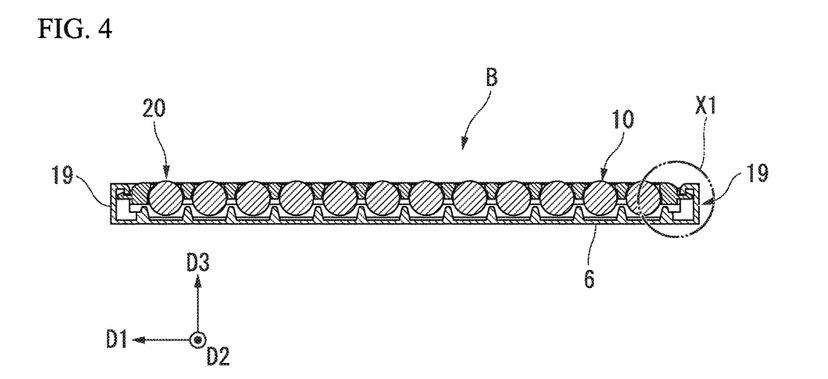
FIG. 4 is a cross-sectional view of a part (corresponding to one partitioned area) taken along an arrow at a position corresponding to line A-A of the article moving device illustrated in FIG. 1 which is assembled.

FIG. 4 is a cross-sectional view of the article moving device 1 taken along line A-A illustrated in FIG. 1, and is a view illustrating one partitioned area 13 of the article moving device 1 which does not have the cover member 20 being disposed over the partitioned area B, is not exposed to an external force and the like, and is not being bent. FIG. 5 is an enlarged cross-sectional view of an area X1 illustrated in FIG. 4.

As illustrated in FIGS. 4 and 5, the upper end surface of the cover member 20, the upper end surface of the wall-side hook section 34 of the partition wall 19 and the partition member support section 17 of the base member 5, and the upper end surface of the sidewall section 7 are substantially flush, i.e., substantially at the same level. In this way, a moving surface 52 (see FIG. 6) of the article moving device 1 is secured to the outer edge of the base member 5 including the sidewall section 7.

The cover-side engaging protrusion 22 can be engaged with a lower surface 32d of the wall-side engaging protrusion 32. In this way, movement of the cover member 20 is suppressed in a direction away from the bottom plate section 6 of the base member 5 (a direction of an arrow D3 illustrated in FIG. 4).

Further, the cover-side engaging protrusion 22 can be engaged with a distal end of the wall-side hook section 34. That is, when the cover member 20 is disposed in the opening section 9 of the base member 5, the wall-side hook section 34 is formed at the distal end of the wall-side engaging protrusion 32 in a posture protruding toward the cover-side engaging protrusion 22.

The cover-side hook section 24 protrudes toward the wall-side engaging protrusion 32 and can be engaged with the wall-side hook section 34. In this way, movement of the end surface 20e of the cover member 20 is suppressed in a direction away from the partition wall 19 or the partition member support section 17 of the base member 5 (the direction of the arrow D1 illustrated in FIG. 4 or a reverse direction to the direction of the arrow D1). From the viewpoint of providing sufficient engagement between the cover-side hook section 24 and the wall-side hook section 34 and more reliably holding the cover-side hook section 24, the protruding length of the cover-side hook section 24 from the cover-side engaging protrusion 22 is preferably 0.3 mm to 1.3 mm. From the same viewpoint, the protruding length of the wall-side hook section 34 from the wall-side engaging protrusion 32 is preferably 0.3 mm to 1.3 mm. This can sufficiently secure not only an allowable range of a distance between the distal end of the cover-side hook section 24 and the lower surface 32d of the wall-side engaging protrusion 32 such that the engagement between the cover-side hook section 24 with the lower surface 32d of the wall-side engaging protrusion 32 can be maintained, but also an allowable range of a distance of displacement of a wall surface of the cover-side hook section 24 facing the inside of the cover member 20 in the wall surface direction with respect to an inner surface 34d of the wall-side hook section 34.

The material of the cover member 20 is not particularly limited but is preferably a material capable of smoothly rotating the roller members 10 accommodated in the roller member accommodating sections 8 and having appropriate elasticity and strength. Examples of a material having appropriate elasticity and strength include resins such as POM, HIPS, polycarbonate (PC), and PPS. Also, from the viewpoint of obtaining appropriate elasticity and strength and preventing damage and the like even when the thickness of the article moving device 1 is reduced, the cover member 20 is preferably formed of POM as in the case of the base member 5.

Also, from the viewpoint of smoothly rotating the roller main body part 10*a* of the roller member 10, the cover member 20 is preferably formed of a material in which the static friction coefficient with respect to the roller shaft part 10*b* is about 0.1 to 0.5.

<Display Rack>

FIG. 6 is a schematic view of the display rack 50 according to the present embodiment.

The display rack 50 includes at least one article moving device 1. Specifically, the article moving device 1 is placed on the display rack so that one direction of the article moving device 1 (that is, the direction orthogonal to the axis of the roller main body part 10*a* of the roller member 10 and the direction D1 illustrated in FIG. 6) is a front-back direction of the display rack 50. In FIG. 6, from the viewpoint of promptly moving the article P from the back side toward the front side of the display rack 50, the back side of the display rack 50 may be disposed slightly above the front side. According to this arrangement, the moving surface 52 of the article constituted by the roller surface 10*s* of the roller member 10 is formed to descend from the back side toward the front side of the display rack.

In FIG. 6, the display rack 50 in which two article moving devices 1 are connected in the direction of the arrow D2 and the article moving devices 1 connected to each other are disposed in multiple stages is illustrated. In the display rack 50, the number of the article moving devices 1 connected to each other and the number of stages of the connected article moving devices 1 are not particularly limited and can be appropriately set in consideration of the size and the shape of the display rack 50, the size of a refrigerator which accommodates the display rack, and the like.

The arrangement of the articles P on the article moving device 1 in the display rack 50 is not particularly limited. From the viewpoint of rapidly moving the articles P in the direction of the arrow D1 from the back side toward the front side of the display rack 50, the articles P are preferably placed to form rows in an extending direction of the moving surface for the articles constituted by the roller surfaces 10*s* of the roller members (in other words, one direction which is the direction orthogonal to the axis of the roller main body parts 10*a* of the roller members 10).

For the articles on the article moving device 1, by arranging the moving surface 52, on which the forefront article P is taken out of the display rack 50 and the article behind moves forward, so that the article P descends from the back side toward the front side of the display rack 50, the roller members 10 rotate due to friction with the article P. Because the article P is conveyed on the roller members 10 along one direction (i.e., the direction of the arrow D1) by the rotation of the roller members 10, the article P moves forward on the article moving device 1, and the article P is always disposed at the forefront side of the article moving device 1.

<Formation of Article Moving Device and Display Rack>

When forming the article moving device 1, first, the plurality of roller members 10 are placed on the base member 5 along one direction so that axes of the plurality of roller members 10 are parallel to each other (see FIG. 2). Here, a side of each of the roller members 10 below the roller shaft part 10*b* is accommodated in each of the roller member accommodating sections 8. In this way, the roller members 10 are positioned. Also, the pair of roller shaft parts 10*b* and 10*b* of each of the roller members 10 abut the upper surface 6*u* of the bottom plate section 6 of the base member 5 from above.

Next, the cover member 20 is mounted over each of the partitioned areas B of the base member 5 by the cover-side engaging protrusion 22 and the cover-side hook section 24 being fitted to and engaged with the corresponding wall-side engaging protrusion 32 and the wall-side hook section 34. In this way, the plurality of roller members 10 placed on the base member 5 are rotatably accommodated between the base member 5 and the cover member 20. At the same time, a side of the roller main body part 10*a* of each of the roller members 10 above the roller shaft part 10*b* passes through the roller member penetrating section 28 from below and protrudes upward from the cover member 20. Here, a part of the roller surface 10*s* of the roller member 10 is exposed from the roller member penetrating section 28 of the cover member 20. In this way, the article moving device 1 is completed.

When forming the display rack 50, the display rack 50 is completed by the connecting section 38 of the article moving device 1 formed as described above being fitted to the receiving section 39 of another article moving device 1, and the article moving devices 1 connected to each other being disposed corresponding to the shape of the rack board 60 of the display rack 50. When forming the article moving device 1 as described above or carrying the article moving device 1 for movement, the article moving device 1 is bent in some cases.

Figure 7:
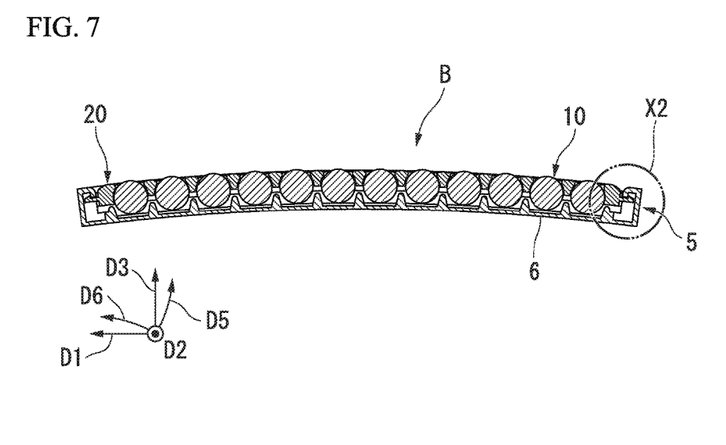
FIG. 7 is a cross-sectional view illustrating a state in which a part of the article moving device illustrated in FIG. 4 is bent.
Figure 8:
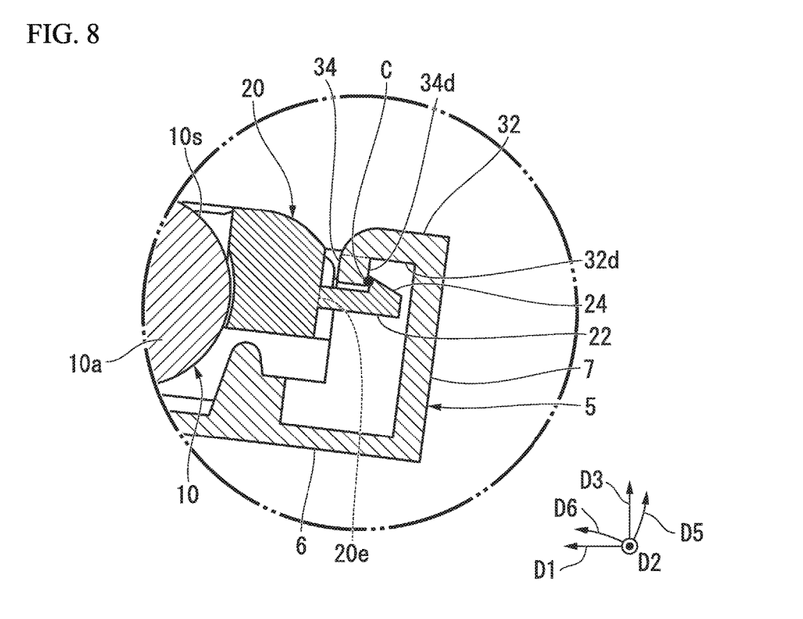
FIG. 8 is a view illustrating an article moving device which is bent according to an embodiment of the present invention and is an enlarged cross-sectional view of an area X2 illustrated in FIG. 7.

FIG. 7 is a cross-sectional view corresponding to a case in which the article moving device 1 is seen in the direction of line A-A illustrated in FIG. 1 and is a view illustrating the article moving device 1 which is bent due to an application of an external force, for example, in the direction of the arrow D3 in a state in which the cover member 20 is disposed in the partitioned area B. FIG. 8 is an enlarged cross-sectional view of an area X2 illustrated in FIG. 7.

When the article moving device 1 is being carried, by one end of the article moving device 1 in the front-back direction being held and the other end hanging down by its own weight, the article moving device 1 is bent into a convex shape, and an external force is applied to the article moving device 1.

As illustrated in FIG. 7, when an external force within a range demonstrating the elasticity of each of the cover member 20 and the base member 5 is applied to the article moving device 1, for example, the article moving device 1 is bent in the direction of the arrow D3, and the bottom plate section 6 of the base member 5 and the cover member 20 are sequentially bent in the direction of the arrow D3 and elastically deformed.

Here, the end surface 20*e* of the cover member 20 moves in a direction away from the bottom plate section 6 of the base member 5 (a direction of an arrow D5 illustrated in FIG. 7) and a direction away from the partition wall 19 or the partition member support section 17 of the base member 5 (a direction of an arrow D6 illustrated in FIG. 7). The distal end of the cover-side hook section 24 approaches the lower surface 32*d* of the wall-side engaging protrusion 32, and the wall surface of the cover-side hook section 24 facing the inside of the cover member 20 more firmly abuts the wall surface of the wall-side hook section 34 facing the partition wall 19 or the partition member support section 17 of the base member 5. Therefore, the cover-side hook section 24 of the cover member 20 is firmly engaged with the wall-side hook section 34 of the base member 5 at a position C. The position C is a position at which the wall surface of the cover-side hook section 24 facing the inside of the cover member 20 abuts the wall surface of the wall-side hook section 34 facing the partition wall 19 or the partition member support section 17 of the base member 5. The degree of engagement strength between the cover-side hook section 24 and the wall-side hook section 34 increases as the degree of elastic deformation of the bottom plate section 6 of the base member 5 and the cover member 20 increases. The strong engagement between the cover-side hook section 24 and the wall-side hook section 34 suppresses movement of the cover member 20 in the direction away from the bottom plate section 6 and movement of the end surface 20*e* of the cover member 20 in the direction away from the partition wall 19 or the partition member support section 17, such that the cover-side hook section 24 and the wall-side hook section 34 are not disengaged from each other.

When carrying the article moving device 1, holding both ends of the article moving device 1 in the front-back direction may cause the article moving device 1 to be bent to form a concave shape in the direction of the arrow D3.

In the above case, the article moving device 1 bends in a direction opposite to the direction of the arrow D3, and the bottom plate section 6 of the base member 5 and the cover member 20 are sequentially bent in a concave shape in the direction of the arrow D3 and are elastically deformed. Although not illustrated, even in this case, like the case in which the bottom plate section 6 of the base member 5 and the cover member 20 are bent in a convex shape in the direction of the arrow D3 and are elastically deformed, the distal end of the cover-side hook section 24 approaches the lower surface 32*d* of the wall-side engaging protrusion 32, and the wall surface of the cover-side hook section 24 facing the inside of the cover member 20 more firmly abuts the inner surface 34*d* of the wall-side hook section 34 facing the partition wall 19 or the partition member support section 17 of the base member 5. Therefore, the cover-side hook section 24 of the cover member 20 is firmly engaged with the inner surface 34*d* of the base member 5 at the position C. Also, the strong engagement between the cover-side hook section 24 and the inner surface 34*d* suppresses movement of the cover member 20 in the direction away from the bottom plate section 6 and movement of the end surface 20*e* of the cover member 20 in the direction away from the partition wall 19 or the partition member support section 17, such that the cover-side hook section 24 and the inner surface 34*d* are not disengaged.

In the article moving device 1 of the present embodiment described above, the flexural modulus, the first parameter, and the second parameter of the material of the base member 5 are within the above ranges, whereby physical properties are balanced, and the base member 5 is imparted with strength and flexibility which are appropriate in view of the thickness thereof. Therefore, according to the article moving device 1 of the present embodiment, even when an external force is applied to the article moving device 1, for example, at the time of being dropped or carried, considerable bending of or damage to the base member 5 can be suppressed, and scattering of the plurality of roller members 10 due to separation of the cover member 20 from the base member 5 can be reliably prevented. Also, the operation efficiency of carrying the article moving device 1 and attaching and detaching the article moving device 1 to and from the display rack can be improved.

In the article moving device 1 of the present embodiment, the cover member 20 is formed of the same material as the base member 5, whereby appropriate strength and elasticity are also imparted to the cover member 20 as in the case of the base member 5. Therefore, even when an external force is applied to the article moving device 1 to elastically deform the base member 5 and the cover member 20, the article moving device 1 is unlikely to be damaged and scattering of the plurality of roller members 10 due to separation of the cover member 20 from the base member 5 can be reliably prevented.

In the article moving device 1 of the present embodiment, even when an external force is applied and the bottom plate section 6 of the base member 5 and the cover member 20 are elastically deformed, the configuration of the article moving device 1 as described above prevents the end surface 20*e* of the cover member 20 from moving largely in the direction away from the partition wall 19 or the partition member support section 17. In this way, the cover member 20 is more reliably kept mounted on the base member 5 without separation of the cover member 20 from the base member 5.

As a result, scattering of the plurality of roller members 10 due to separation of the cover member 20 from the base member 5 can be reliably prevented at the time of being dropped or carried, whereby the operation efficiency of carrying the article moving device 1 and attaching and detaching the article moving device 1 to and from the display rack significantly improves, and storing and managing the article moving device 1 are also facilitated. At the same time, it becomes possible to assign the cover member 20 with a function as a reinforcing member as well as a function to position the roller members 10, whereby the strength of the article moving device 1 against bending of the roller members 10 as a whole can be increased, and the thickness of the article moving device 1 can be reduced.

In the article moving device 1 of the present embodiment, it is preferable that the sidewall section 7 has a function of a beam member. By this configuration, even when an external force is applied to the article moving device 1 and the bottom plate section 6 of the base member 5 is elastically deformed at the time of being dropped or carried, the sidewall section 7 can withstand the bending stress of the base member 5. Also, damage to the base member 5 or scattering of the plurality of roller members 10 due to separation of the cover member 20 from the base member 5 can be reliably prevented.

The display rack 50 of the present embodiment includes at least one article moving device 1.

Therefore, the display rack 50 which has high operation efficiency in carrying and installation/removal, is easy to manage, and has excellent strength and flexibility can be provided.

Further, the thickness of the base member 50 is taken into consideration when selecting the material of the base member 5 as described above, the thickness of the article moving device 1 can be considerably reduced while appropriately maintaining the strength and flexibility of the article moving device 1. That is, a product display space of the display rack 50 can be efficiently utilized.

Although the article moving device 1 and the display rack 50 according to an embodiment of the present invention have been described above, the article moving device and the display rack according to the present invention are not limited to the above-described embodiments and may be modified in various ways within the gist of the present invention described in the claims below.

For example, in the bottom plate section 6 of the base member 5, bearings of the roller shaft parts 10*b* and 10*b* of the roller member 10 may be formed at both sides of the roller member accommodating section 8 in the axial direction, and the roller shaft parts 10*b* and 10*b* of the plurality of roller members 10 may be supported by the bearings. In another example, the roller member 10 may not include the roller shaft parts 10*b* and 10*b* and only include the roller main body part 10*a*.

The plan view shape of the article moving device 1 is not limited to the substantially rectangular shape illustrated in FIGS. 1 and 2 and may be freely set according to the shape of the articles P or an installation space of the display rack. For example, the plan view shape of the article moving device 1 may be circular or linear.

The invention claimed is:

1. An article moving device comprising:
   a plurality of roller members,
   a base member which has a bottom plate section and a peripheral wall section rising from a peripheral section of the bottom plate section and which rotatably accommodates the plurality of roller members, and
   a plate-shaped cover member which is detachably attached to the peripheral wall section so as to cover an opening section surrounded by the peripheral wall section such that a part of a roller surface of each roller member protrudes through the plate-shaped cover member,
   wherein:
   the base member comprises a material having a flexural modulus of 2500 MPa to 4000 MPa, a first parameter of 7.00 to 18.00, as calculated by formula: flexural modulus (MPa)×yield stress in tension (MPa)×thickness (mm)/density (g/cm$^3$)/100000, and a second parameter of 2.00 to 10.00, as calculated by formula: first parameter×nominal tensile strain at break (%)/100.

2. The article moving device according to claim 1, wherein the cover member is formed of the same material as the base member.

3. The article moving device according to claim 2, wherein:
   the peripheral wall section has a wall-side engaging protrusion extending on its side facing or on its side opposite to the opening section;
   the cover member has a cover-side engaging protrusion which is engaged with the wall-side engaging protrusion when the cover member is disposed over the opening section such that movement of the cover member in a direction away from the bottom plate section of the cover member is suppressed;
   the wall-side engaging protrusion has a wall-side hook section which protrudes toward the cover-side engaging protrusion when the cover member is disposed over the opening section; and
   the cover-side engaging protrusion has a cover-side hook section which protrudes toward the wall-side engaging protrusion and is engaged with the wall-side hook section such that movement of an end surface of the cover member facing the peripheral wall section in a direction away from the peripheral wall section is suppressed.

4. The article moving device according to claim 3, wherein a protruding length of the cover-side hook section is 0.3 mm to 1.3 mm.

5. The article moving device according to claim 2, wherein at least part of the peripheral wall section that extends in a direction orthogonal to an axial direction of the roller members accommodated in the base member has a function of a beam member, the at least one part of the peripheral wall section being positioned adjacent to the opening section without being covered by the cover member when the cover member is disposed over the opening section.

6. The article moving device according to claim 1, wherein:
   the peripheral wall section has a wall-side engaging protrusion extending on its side facing or on its side opposite to the opening section;
   the cover member has a cover-side engaging protrusion which is engaged with the wall-side engaging protrusion when the cover member is disposed over the opening section such that movement of the cover member in a direction away from the bottom plate section of the cover member is suppressed;
   the wall-side engaging protrusion has a wall-side hook section which protrudes toward the cover-side engaging protrusion when the cover member is disposed over the opening section; and
   the cover-side engaging protrusion has a cover-side hook section which protrudes toward the wall-side engaging protrusion and is engaged with the wall-side hook section such that movement of an end surface of the cover member facing the peripheral wall section in a direction away from the peripheral wall section is suppressed.

7. The article moving device according to claim 6, wherein a protruding length of the cover-side hook section is 0.3 mm to 1.3 mm.

8. The article moving device according to claim 7, wherein at least part of the peripheral wall section that extends in a direction orthogonal to an axial direction of the roller members accommodated in the base member has a function of a beam member the at least one part of the peripheral wall section being positioned adjacent to the opening section without being covered by the cover member when the cover member is disposed over the opening section.

9. The article moving device according to claim 6, wherein at least part of the peripheral wall section that extends in a direction orthogonal to an axial direction of the roller members accommodated in the base member has a function of a beam member, the at least one part of the peripheral wall section being positioned adjacent to the opening section without being covered by the cover member when the cover member is disposed over the opening section.

10. A display rack comprising at least one article moving device according to claim 9.

11. The article moving device according to claim 1, wherein at least part of the peripheral wall section that extends in a direction orthogonal to an axial direction of the roller members accommodated has a function of a beam member, the at least one part of the peripheral wall section being positioned adjacent to the opening section without being covered by the cover member when the cover member is disposed over the opening section.

12. A display rack comprising at least one article moving device according to claim 1.

13. The article moving device according to claim 1, wherein the plate-shaped cover member has roller member penetrating sections from which roller surfaces of roller members protrude respectively when the cover member is disposed over the opening section.

14. An article moving device comprising:
    a plurality of roller members,
    a base member which has a bottom plate section and a peripheral wall section rising from a peripheral section of the bottom plate section and which rotatably accommodates the plurality of roller members, and a plate-shaped cover member which is detachably attached to the peripheral wall section so as to cover an opening section surrounded by the peripheral wall section such that a part of a roller surface of each roller member protrudes through the plate-shaped cover member, wherein:

the peripheral wall section has a wall-side engaging protrusion protruding on its side facing or on its side opposite to the opening section;

the cover member has a cover-side engaging protrusion which is engaged with the wall-side engaging protrusion when the cover member is disposed over the opening section such that movement of the cover member in a direction away from the bottom plate section of the cover member is suppressed;

the wall-side engaging protrusion has an wall-side hook section which protrudes toward the cover-side engaging protrusion when the cover member is disposed over the opening section; and the cover-side engaging protrusion has an cover-side hook section which protrudes toward the wall-side engaging protrusion and is engaged with the wall-side hook section such that movement of an end surface of the cover member facing the peripheral wall section in a direction away from the peripheral wall section is suppressed.

15. The article moving device of claim 14, wherein a protruding length of the cover-side hook section is 0.3 mm to 1.3 mm.

16. A display rack comprising at least one article moving device according to claim 14.

* * * * *